United States Patent Office 3,235,608
Patented Feb. 15, 1966

3,235,608
FLUORINATION WITH URANIUM HEXAFLUORIDE
Hugh Harper Gibbs, North Graylyn Crest, Del., assignor to E. I. du Pont de Nemours and Company, Wilmington, Del., a corporation of Delaware
No Drawing. Filed Mar. 19, 1962, Ser. No. 180,842
10 Claims. (Cl. 260—648)

This invention relates to the preparation of fluorinated organic compounds by means of a process employing a combination of uranium hexafluoride vapor and a solid inorganic fluoride catalyst.

Fluorinated organic compounds, generally, are prepared either by indirect syntheses involving an interchange between a non-fluorine halosubstituted organic compound and an inorganic fluoride or by direct techniques such as the fluorination of hydrocarbons or the interaction of carbon and fluorine. The fluorination procedures as developed in the early art utilize cobalt fluoride as the source of fluorine atoms. In many instances, however, the reaction is of such vigor as to make the process difficult to control. Inorganic fluorides which have been substituted for cobalt fluoride include the silver, cerium and manganese fluorides. Disclosed more recently in the art are processes for the preparation of fluorocarbons from carbon and pyrolyzed fluorine-containing compounds including inorganic fluorides. Especially suitable are fluorides of the elements of Group VA and some of the elements of Group VIA of the Periodic Chart of the Elements, such as may be found in the Handbook of Chemistry and Physics, pages 448–9, 41st edition, 1959, as well as binary fluorides of elements selected from Groups IVB, VB, and VIB of the Periodic Chart of the Elements. Further details on these processes may be found in U.S. 2,709,190, issued May 24, 1955, to Farlow et al., and U.S. 2,852,574, issued September 16, 1958, to Denison et al. Most of the aforesaid fluorination processes either lack an economic method of preparation and/or recovery and regeneration of the fluorinating agent, or do not provide sufficient control over the reaction.

It is an object of the present invention to provide a process for the preparation of useful fluorinated organic compounds. It is a further object to provide such a process which is economically feasible. Another object is to provide a process wherein the spent fluorinating agent can be recovered and regenerated economically. Still another object is to provide a process yielding products which can be further treated by a directly integrated operation to give additional, valuable, fluorinated organic compounds. Other objects will become apparent hereinafter.

The objects of the invention are achieved by means of a process which comprises contacting a mixture of the vapors of the material to be fluorinated and uranium hexafluoride with a solid inorganic fluoride catalyst at 70–600° C. Although uranium hexafluoride has been recognized as a fluorinating agent, its use has been curtailed because of the difficulty in achieving adequate control in most processes in which it is employed. For example, when it is contacted with paraffin hydrocarbons, undesirable carbonaceous products are formed, whereas with some chlorinated hydrocarbons, the reaction is extremely slow, the hexafluoride in chlorinated hydrocarbon forming a solution which is stable up to several weeks. It has been discovered in the present invention that uranium hexafluoride can be used as an effective and controllable fluorinating agent when it is utilized in the form of its vapor in conjunction with a solid inorganic fluoride catalyst. The necessity for including the latter as a catalyst is unexpected in view of the fact that most of the common fluorinating agents require the use of a second component only as a diluent to moderate the reaction. Further, in the present invention, the use of the second component as a catalyst for the fluorination reaction is limited and specific to those inorganic fluorides which are solid at the temperatures employed for the fluorination. Especially suited are those solid fluorides, of elements selected from the IA, IIA, IIIA, and the B groups of the Periodic Chart of the Elements, and in particular, the fluorides of the above A groups of elements and the tetra-fluoride of uranium. Sodium, potassium, and calcium fluorides are preferred because of their ready availability. Although the mechanism by which the solid inorganic fluorides exert their catalytic influence is not known, it is believed that the effective catalyst is the non-reactive surface provided by the solid inorganic fluoride. As a result, any surface which is non-reactive to both the fluorinating agent and the organic material, before and after fluorination under the conditions of the reaction, may be used. The solid inorganic fluorides of the present invention, therefore, provide a useful example of this type of non-reactive solid surface. Because of the importance of the surface of the solid inorganic fluoride catalysts, it is preferably to employ finely divided fluorides. Because of the tendency of intermediate reaction products to sinter during the fluorination, however, some discretion must be used in the selection of particle size. For the finely divided catalysts fluidized bed techniques must be employed to preclude agglomeration of the catalyst particles. Where such techniques are not feasible, a balance between optimum surface area and minimization of agglomeration tendencies may be reached by utilizing pellets of the inorganic fluoride. Pellets having a diameter of $\frac{1}{8}$–$\frac{1}{4}$ inch have been found to be especially convenient in the present invention because of their ready availability and their ability to remain unagglomerated during the fluorination.

The temperature of fluorination in the present invention may vary from about 70° C. to 600° C. At low temperatures, the reaction rates frequently are to slow for commercial feasibility so that in practice, the temperature is maintained in the range of 100–600° C. When preparing fluorinated hydrocarbons containing two or more carbon atoms, chain scission becomes the predominant reaction above 300° C. As a result, the maximum temperature should be limited to 300° C. when preparing this type of fluorinated hydrocarbon if chain scission is to be avoided.

Contact time for the reaction will be determined by the other variables in the system as well as the nature of the material to be fluorinated and the extent of fluorination desired in the product. Although times of a few seconds to a day are not unusual for laboratory-scale experiments, commercial economics usually requires the contact time to be limited from a few seconds to thirty minutes, and especially from about thirty seconds to five minutes.

The pressure employed for the reaction is critical only to the extent that it influences the physical state of the reactants. The material which is to be fluorinated usually is vaporized, mixed with uranium hexafluoride vapor and then passed through a bed of the hot, solid, inorganic fluoride catalyst. Because of economic feasibility, the process normally is carried out at about atmospheric pressure, although subatmospheric or superatmospheric pressures may be used as long as the other operating conditions are met.

The feed ratio of uranium hexafluoride to the material being fluorinated, likewise, is not unduly critical provided at least stoichiometric quantities of fluorine atoms are available. For most fluorinations, molar feed ratios of 1/1 to 30/1 are satisfactory. It has been found, however, that when certain, solid, inorganic fluorides are used as catalysts, complexes thereof may be formed with the uranium hexafluoride. Sodium fluoride provides an example of such a material. The quantity of fluorinating agent necessary is more realistically measured in terms of the ratio of the amount of fluorinating agent consumed to the amount of organic raw material fed, the actual ratio selected being dependent upon the extent of fluorination desired, conversion and yield. As an example may be cited the fluorination of methane to trifluoromethane. To achieve complete conversion of methane to fluorinated products, it may be seen from the following table, all other conditions being maintained constant, that the ratio of uranium hexafluoride consumed to methane fed must be about 3.0.

FLUORINATION OF METHANE WITH URANIUM HEXAFLUORIDE

| Mole Percent Methane Conversion | Moles $UF_6$ Consumed/Mole $CH_4$ Fed |
|---|---|
| 0 | 0 |
| 20 | 0.3 |
| 40 | 0.8 |
| 60 | 1.2 |
| 80 | 1.9 |
| 100 | 3.0 |

The ratio of uranium hexafluoride consumed to methane fed, likewise, must be adjusted in order to achieve the maximum amount of trifluoromethane relative to the fluorinated by-products. As is evident from the following table, all other conditions being maintained constant, the optimum ratio is 1.9 to 3.0, the same ratio at which excellent conversion of methane is realized.

FLUORINATION OF METHANE WITH URANIUM HEXAFLUORIDE

| Mole % $CH_4$-Free $CHF_3$ in Product | Moles $UF_6$ Consumed/Mole $CH_4$ Fed |
|---|---|
| 0 | 0.0 |
| 20 | 0.6 |
| 40 | 1.3 |
| 50 | 1.9 |
| 52 | 2.0 |
| 54 | 2.2 |
| 56 | 2.5 |
| 50 | 3.0 |
| 26 | 3.6 |

It has been noted in the instant fluorination of methane that the product contains in excess of 50 mole percent of the desirable trifluoro derivative, whereas the corresponding trichloro derivatives, prepared from methane by conventional chlorination techniques, comprises only 40–45 mole percent of the chlorinated product. It further has been observed that the ratio of desired trifluoro derivative to by-product tetrafluoro derivative, under optimum conditions, is 3–4/1, whereas the ratio of the corresponding chloro compounds obtained by conventional chlorination techniques is only 1.5/1. Based on the above a particularly preferred embodiment for the fluorination of methane by means of the present invention is achieved by maintaining a ratio of moles uranium hexafluoride consumed to moles methane fed of 1.9–3.0, a ratio of uranium hexafluoride to methane in the feed mixture of 3/1 to 10/1, a methane conversion of 85–100 mole percent, a reaction temperature of 300–400° C. and a contact time of 0.5–2.0 minutes.

As another example of the usefulness of the present invention may be shown the fluorination of methyl chloride to mixed chlorofluoro derivatives and especially to monochlorodifluoromethane. In this case, the product contains a maximum of 67 mole percent of the difluoro derivative at a 97–100% conversion of methyl chloride when the ratio of uranium hexafluoride consumed to methyl chloride fed is about 1.80–2.0. Although the optimum, in terms of maximum quantity of monochlorodifluoromethane in the product at a high conversion of methyl chloride, is achieved at a ratio of moles uranium hexafluoride consumed to moles methyl chloride fed of 1.8–2.0, it has been discovered that the product so formed contains fluorinated by-products which are difficult to separate from the difluoro derivative. This difficulty is circumvented by operating at a ratio less than 1.8–2.0. At lower conversions of methyl chloride less fluorinated by-products are formed and the difluoro derivative is easily separated from the unconverted methyl chloride. For example, at a ratio of moles uranium hexafluoride consumed to moles methyl chloride fed of 1.8–2.0 the product, after removal of unconverted methyl chloride, contains 67 mole percent monochlorodifluoromethane, but in addition, five fluorinated by-products. When the above ratio is reduced to 1.0, the methyl chloride conversion is 70% and the product contains 46 mole percent of the difluoro derivative but only two by-products, 53 mole percent monochloromonofluoromethane and 1 mole percent difluoromethane. Further reduction of the above ratio to 0.75 provides a methyl chloride conversion of 56% and a product composition of 30 mole percent difluoro derivative and 70 mole percent monochloromonofluoromethane, the latter of which may be recycled for further fluorination. Based on the above, a particularly preferred embodiment for the fluorination of methyl chloride is realized by maintaining a ratio of moles uranium hexafluoride consumed to moles methyl chloride fed of 0.75–1.0, a ratio of uranium hexafluoride to methyl chloride in the feed mixture of 3/1 to 10/1, a methyl chloride conversion of 55–70 mole percent, a reaction temperature of 85–150° C. and a contact time of 1.0–5.0 minutes.

A wide variety of organic compounds can be fluorinated by the process of this invention. Those compounds most useful herein are the 1–12 carbon atom hydrocarbons and non-perfluorinated halohydrocarbons, and especially those compounds containing 1–4 carbon atoms. The preferred non-perfluorinated halohydrocarbons in both the 1–12 and 1–4 carbon atom ranges are the chloro and chlorofluoro derivatives. Particularly preferred compounds which may be fluorinated by means of this invention are methane, ethane, propane, methyl chloride and benzene. The process, likewise, has been found useful for the fluorination of inorganic compounds, for example, ammonia, as well as some oxygen-containing organic compounds.

The by-product uranium tetrafluoride from the instant fluorination process conveniently may be reconverted to uranium hexafluoride by conventional methods, such as by oxidation with oxygen as is described in U.S. Patents 2,535,572, issued December 26, 1950, to Hainer, and 2,910,344, issued October 27, 1959, to Davidson et al. The uranyl fluoride which is formed along with the hexafluoride in the oxidation step may be reconverted to uranium tetrafluoride, for example, by reduction to uranium dioxide followed by conversion to the tetrafluoride with hydrofluoric acid. The attractiveness of the instant fluorination process is enhanced, therefore, not only by the regenerative aspect of the uranium cycle, but particularly because the regeneration step requires the use of the relatively inexpensive hydrofluoric acid instead of free fluorine which must be used in most regenerative or preparative processes employing other fluorinating agents.

A still further feature of the present fluorination process is that it conveniently may be integrated with a subsequent dehydrofluorination process by which valuable, polymerizable, unsaturated, fluorinated organic compounds may be synthesized. Hydrocarbons, especially those containing 1–12 carbon atoms, first may be fluorinated so as to retain at least one reactive hydrogen atom, thence the dehydrofluorinated to produce the unsaturated fluorinated hydrocarbon. For example, tetrafluoroethylene may be prepared either from ethane, by fluorination to pentafluoroethane and subsequent dehydrofluorination, or from methane, by fluorination to trifluoromethane and subsequent dehydrofluorination and coupling, the dehydrofluorination, like the fluorination, supra, is catalyzed by a solid inorganic fluoride. Unlike the catalysis described for the fluorination reaction, however, only alkali metal fluorides may be employed, with the activity thereof increasing with increasing atomic number of the alkali metal. In general, it has been observed that the temperature employed for the dehydrofluorination should be in excess of 600° C., with the maximum temperature usually being held below 1000° C. The range 650–800° C. is optimum. If desirable, the fluorination-dehydrofluorination reactions may be integrated by carrying out the process in a tubular reactor having the necessary temperature profile to effect both reactions. The solid inorganic fluoride catalyst employed therein may be an alkali metal fluoride throughout or an alkali metal fluoride for the dehydrofluorination and a non-alkali metal fluoride for the fluorination. Preferably, to provide selectivity in the dehydrofluorination stage, a refining train is included between the fluorination and dehydrofluorination zones. Parallel reactors may be utilized and operated alternately to achieve integration of the catalyst regeneration step and the fluorination or fluorination-dehydrofluorination steps. As a further feature of the integrated processes, the by-product hydrofluoric acid from the dehydrofluorination stage may be recycled to the catalyst regeneration stage for converting the uranium dioxide to uranium tetrafluoride.

The following examples are intended to demonstrate but not limit the usefulness of the invention as hereinabove disclosed. It should be noted that mole ratios of reactants in the examples refer to feed ratios.

*Example I*

In order to show the necessity for the inorganic fluoride catalyst in the present uranium hexafluoride fluorination, methane is fluorinated at 150° C. employing a uranium hexafluoride to methane mole ratio of 4.7 and a contact time of five minutes. Absent the contacting of the mixed vapors with an inorganic fluoride, only 0.01 mole percent methyl fluoride is obtained from the gas collected exit the reactor, the remainder being unconverted methane. When the uranium hexafluoride-methane vapors are contacted with a sodium fluoride catalyst, all other conditions being constant, the exit gas contains 44.2 mole percent fluorinated products.

*Example II*

The reactor employed in the present fluorination process may be fabricated from any material which is inert to the reactants and products in the fluorination reaction. Monel metal and stainless steel have been found most satisfactory in the present invention because of their commercial availability.

A mixture of $UF_6$ and $CH_4$ (mole ratio $UF_6/CH_4=$ 9/1 by metering through rotameters) is passed continuously through a Monel tube (1 inch O.D. x 36 inches long) packed with 315 grams of NaF pellets and heated to 386° C. by means of a split-tube electric furnace. Under operation at atmospheric pressure and a hold-up time of approximately two minutes, the effluent gas is collected in a stainless steel sample cylinder. Samples are withdrawn from the sample cylinder through an ice-cooled bed of NaF pellets which complexes with by-product HF and unreacted $UF_6$. Conventional gas chromatographic and infrared analyses show that the product contains the following mole percent composition:
$CH_4$, 0%; $CH_3F$, 2%; $CH_2F_2$, 23%; $CHF_3$, 54%; $CF_4$, 21%. If desired, the $CH_3F$ and $CH_2F_2$ may be recycled for further fluorination.

*Example III*

A mixture of $UF_6$ and $CH_4$ (mole ratio $UF_6/CH_4=$ 4.7/1 by metering through rotameters) is introduced into a Monel reaction vessel packed with 282 grams of NaF pellets. After the metered reactants are introduced, the vessel is sealed and heated autogenously to 210° C. by means of electrical heating tape. After a hold-up time of 17.8 hours, the product is analyzed as above and contains the following mole percent composition: $CH_4$, 0%; $CH_3F$, 0.2%; $CH_2F_2$, 1.0%; $CHF_3$, 1.0%; $CF_4$, 97.8%. Similar results are achieved by operation of the process at a higher temperature and a shorter contact time.

*Example IV*

Using the same apparatus as described in Example II, a mixture of $UF_6$ and $C_2H_6$ (mole ratio $UF_6/C_2H_6=$ 10/1) is passed continuously over KF pellets at 200° C. After a contact time of five minutes, the product is found to contain the following mole percent composition: $C_2H_6$, 10%; $C_2HF_5$, 50%; $C_2F_6$, 5%; other hydrofluoroethanes, 35%. The $C_2HF_5$ is dehydrofluorinated over an alkali metal fluoride between 600–1000° C. to yield the polymerizable monomer tetrafluoroethylene.

*Example V*

Using the same apparatus as described in Example II, a mixture of $UF_6$ and $C_3H_8$ (mole ratio $UF_6/C_3H_8=20/1$)

is passed continuously over NaF pellets at 150° C. After a contact time of five minutes, the product is found to contain the following mole percent composition: $C_3H_8$, 20%; $CHF_2CF_2CF_3$, 45%; $C_3F_8$, 10%; other hydrofluoropropanes, 20%; fluoromethanes and fluoroethanes, 5%. The $CHF_2CF_2CF_3$ is dehydrofluorinated over an alkali metal fluoride between 600–1000° C. to yield the polymerizable monomer hexafluoropropylene.

*Example VI*

Using the same type of apparatus as that described in Example III a mixture of $UF_6$ and $CH_3Cl$ (mole ratio $UF_6/CH_3Cl=8/1$)

is allowed to react autogenously for 25 minutes at 86° C. over a catalyst consisting of $CaF_2$ containing 0.1 weight percent $Cr_2O_3$. The product is analyzed as above and contains the following mole percent composition: $CH_3Cl$, 1.3%; $CH_2FCl$, 11.8%; $CHF_2Cl$, 78.3%; $CF_3Cl$, 1.8%; $CH_3F$, 0.1%; $CH_2F_2$, 2.7%; $CHF_3$, 4.0%. The $CHF_2Cl$ is dehydrochlorinated and coupled, by heating to about 700° C. without a catalyst, to yield tetrafluoroethylene.

*Example VII*

The mixture employed in Example VI is passed continuously over KF pellets at 273° C. using the same type of apparatus as that described in Example II. With a reaction time of 2.2 minutes a product comparable to that formed in Example VII is obtained.

*Example VIII*

Using the same apparatus as that employed in Example III, a mixture of $UF_6$ and $CF_3CF=CF_2$ (mole ratio $UF_6/C_3F_6=1/1$)

is allowed to react autogeneously for fifteen minutes at 93° C. over a catalyst consisting of $CaF_2$ containing 0.1 weight percent $Cr_2O_3$. The product is analyzed as above and contains the following mole percent composition: $CF_3CF=CF_2$, 87.8%; $C_3F_8$, 11.2%

$$(CF_3)_2CF—CF(CF_3)_2$$

0.8%; unknown, 0.2%. This example illustrates the use of the invention for the fluorination of carbon-carbon unsaturation.

*Example IX*

Using the same apparatus as that described in Example III a mixture of UF$_6$ and benzene (mole ratio UF$_6$/benzene = 15/1 is contacted with CaF$_2$ pellets autogenously at 350° C. for thirty minutes. Essentially all the benzene is converted to perfluorocyclohexane.

I claim:
1. The preparation of fluorinated organic compounds selected from the group consisting of 1–12 carbon atom hydrocarbons, chloro and chlorofluoro derivatives of 1–12 carbon atom hydrocarbons by a process which comprises the steps of contacting a feed mixture of uranium hexafluoride vapor and the vapor of said organic compound to be fluorinated with a solid inorganic fluoride selected from the group consisting of sodium, potassium and calcium fluorides at a temperature of 70–600° C., and thereafter collecting said fluorinated organic compound.
2. The process of claim 1 wherein the organic compound to be fluorinated is methane.
3. The process of claim 1 wherein the organic compound to be fluorinated is methyl chloride.
4. The process of claim 1 wherein the organic compound to be fluorinated is benzene.
5. The process of claim 1 wherein the ratio of uranium hexafluoride to organic compound in said feed mixture is 1/1 to 30/1 and wherein the mixture is contacted with the solid inorganic fluoride at about atmospheric pressure at 100–600° C.
6. The process of claim 1 wherein said fluoride is sodium fluoride.
7. The process of claim 1 wherein said fluoride is potassium fluoride.
8. The process of claim 1 wherein said fluoride is calcium fluoride.
9. The preparation of trifluoromethane by a process which comprises the steps of contacting at about atmospheric pressure a feed mixture comprising uranium hexafluoride vapor and methane vapor, at a molar ratio of uranium hexafluoride to methane of 3/1 to 10/1, with a solid fluoride of a metal selected from the group consisting of sodium, potassium and calcium fluorides for 0.5–2.0 minutes at a temperature of 300–400° C., and thereafter collecting said trifluoromethane.
10. The preparation of monochloromonofluoromethane and monochlorodifluoromethane by a process which comprises the steps of contacting at about atmospheric pressure a feed mixture comprising uranium hexafluoride vapor and methyl chloride vapor, at a molar ratio of uranium hexafluoride to methyl chloride of 3/1 to 10/1, with a solid fluoride selected from the group consisting of sodium, potassium and calcium fluoride for 1.0–5.0 minutes at a temperature of 85–150° C., and thereafter collecting said monofluoro and difluoromethanes.

References Cited by the Examiner
UNITED STATES PATENTS

| | | | |
|---|---|---|---|
| 2,505,877 | 5/1950 | Benning | 260—650 X |
| 2,574,619 | 11/1951 | Cady | 260—648 |
| 2,744,148 | 5/1956 | Ruh et al. | 260—648 X |
| 2,924,626 | 2/1960 | Boyer et al. | 260—653.5 |

FOREIGN PATENTS 619,394  3/1949  Great Britain.

OTHER REFERENCES

Nairn et al.: "Proc. 2nd U.N. Conf, Peaceful Uses Atomic Energy, Geneva," 1958, paper 300, vol. 4, pages 191 to 195.

Hudlicky: Chemistry of Organic Fluorine Compounds (New York, 1961) p. 101.

Stacey et al.; Advances in Fluorine Chemistry, vol. II, Butterworth, London (1961), p. 162.

LEON ZITVER, *Primary Examiner.*